(12) United States Patent
King

(10) Patent No.: US 7,870,436 B2
(45) Date of Patent: Jan. 11, 2011

(54) SYSTEM AND METHOD FOR TRACING ACCELERATION IN AN EMBEDDED DEVICE

(75) Inventor: James King, Wokingham (GB)

(73) Assignee: Broadcom Corporation, Irvine, CA (US)

( * ) Notice: Subject to any disclaimer, the term of this patent is extended or adjusted under 35 U.S.C. 154(b) by 619 days.

(21) Appl. No.: 11/740,276

(22) Filed: Apr. 25, 2007

(65) Prior Publication Data

US 2008/0270844 A1 Oct. 30, 2008

(51) Int. Cl.
*G06F 11/00* (2006.01)

(52) U.S. Cl. .............................. 714/45; 714/30; 717/128

(58) Field of Classification Search .................. 714/30, 714/45; 717/128
See application file for complete search history.

(56) References Cited

U.S. PATENT DOCUMENTS

| | | | |
|---|---|---|---|
| 5,544,311 A * | 8/1996 | Harenberg et al. ............ | 714/40 |
| 5,625,785 A * | 4/1997 | Miura et al. ................. | 712/227 |
| 6,507,921 B1 * | 1/2003 | Buser et al. .................. | 714/45 |
| 6,594,782 B1 * | 7/2003 | Tagawa ........................ | 714/30 |
| 6,732,307 B1 * | 5/2004 | Edwards ...................... | 714/724 |
| 6,735,679 B1 * | 5/2004 | Herbst et al. ................. | 711/167 |
| 6,918,065 B1 * | 7/2005 | Edwards et al. ............... | 714/45 |
| 7,139,902 B2 * | 11/2006 | Lee ............................. | 712/234 |
| 7,340,564 B2 * | 3/2008 | Twomey ...................... | 711/125 |
| 7,346,895 B2 * | 3/2008 | Yang ........................... | 717/128 |
| 7,496,818 B1 * | 2/2009 | Azimi et al. ................. | 714/733 |
| 2002/0059511 A1 * | 5/2002 | Sudo et al. ................... | 712/207 |
| 2003/0046610 A1 * | 3/2003 | Yamamoto et al. ............ | 714/34 |
| 2005/0022066 A1 * | 1/2005 | Herbst ......................... | 714/42 |
| 2006/0259831 A1 * | 11/2006 | Sohm et al. ................... | 714/45 |
| 2007/0050600 A1 * | 3/2007 | Hill et al. ..................... | 712/214 |
| 2008/0072103 A1 * | 3/2008 | Lou ............................. | 714/38 |

* cited by examiner

*Primary Examiner*—Robert Beausoliel
*Assistant Examiner*—Elmira Mehrmanesh
(74) *Attorney, Agent, or Firm*—Duane S. Kobayashi

(57) ABSTRACT

A system and method for tracing acceleration in an embedded device. Various embedded devices that generate debug trace output for which the usage of the processor can benefit from optimization include mobile phones, TV set-top-boxes, and networking equipment. Tracing acceleration is accomplished using a logic unit that is implemented in hardware, which thereby enables the processing of tracing data to be handled in parallel to the operation of the processor.

21 Claims, 3 Drawing Sheets

SYSTEM AND METHOD FOR TRACING ACCELERATION IN AN EMBEDDED DEVICE

BACKGROUND

1. Field of the Invention

The present invention relates generally to embedded devices and, more particularly, to a system and method for tracing acceleration in an embedded device.

2. Introduction

Mobile phones typically support detailed tracing of stack functionality for use in debugging problems during development and field trial. The complexity of the air interface protocols in particular necessitates the provision of a large amount of data for diagnosing issues seen with the protocol stack. In general, the variety of network configurations and equipment dictates that all the tracing functionality should be available within the standard phone hardware for network operator testing.

In today's mobile phone market, competitiveness is often based on the mobile phone's ability to compete in areas such as low cost and low power operation. For these reasons, the addition of tracing functionality should not add significant cost, nor have a significant impact on the CPU usage within the mobile phone. What is needed therefore is a mechanism that enables tracing functionality to be supported by a mobile phone, with such support having a minimal impact on the various costs of the mobile phone.

SUMMARY

A system and/or method for tracing acceleration in an embedded device, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Many problems that occur in embedded devices (e.g., mobile phones) are rare and difficult to reproduce. For this reason, it is desirable that the embedded device has some form of tracing functionality that enables operators to solve issues during field trials and after release of the product. Often, tracing output must be kept to a low level to minimize the performance impact of the tracing system on the embedded device. Even when limited to just the most important traces, a mobile phone's tracing functionality can take more than 10% of the total CPU processing time.

To reduce the impact on the total CPU processing time, the embedded device can be configured to produce less tracing information. Without enough debugging information, however, some problems can be very difficult to solve. Much time can then be wasted trying to reproduce the problem after the enabling of better tracing functionality. In addition, some problems cannot be accurately reproduced with the appropriate tracing to solve them due to the affect on performance of the additional tracing.

In this context, it is a feature of the present invention that a much higher level of tracing can be maintained with little impact on the performance of the embedded device. This enables a better diagnosis of problems. In one embodiment, the tracing functionality is offloaded from the processor, thereby enabling the embedded device to use a less powerful processor than might otherwise be required. This savings is gained through the implementation of tracing functionality in hardware for a small additional cost.

Figure 1:
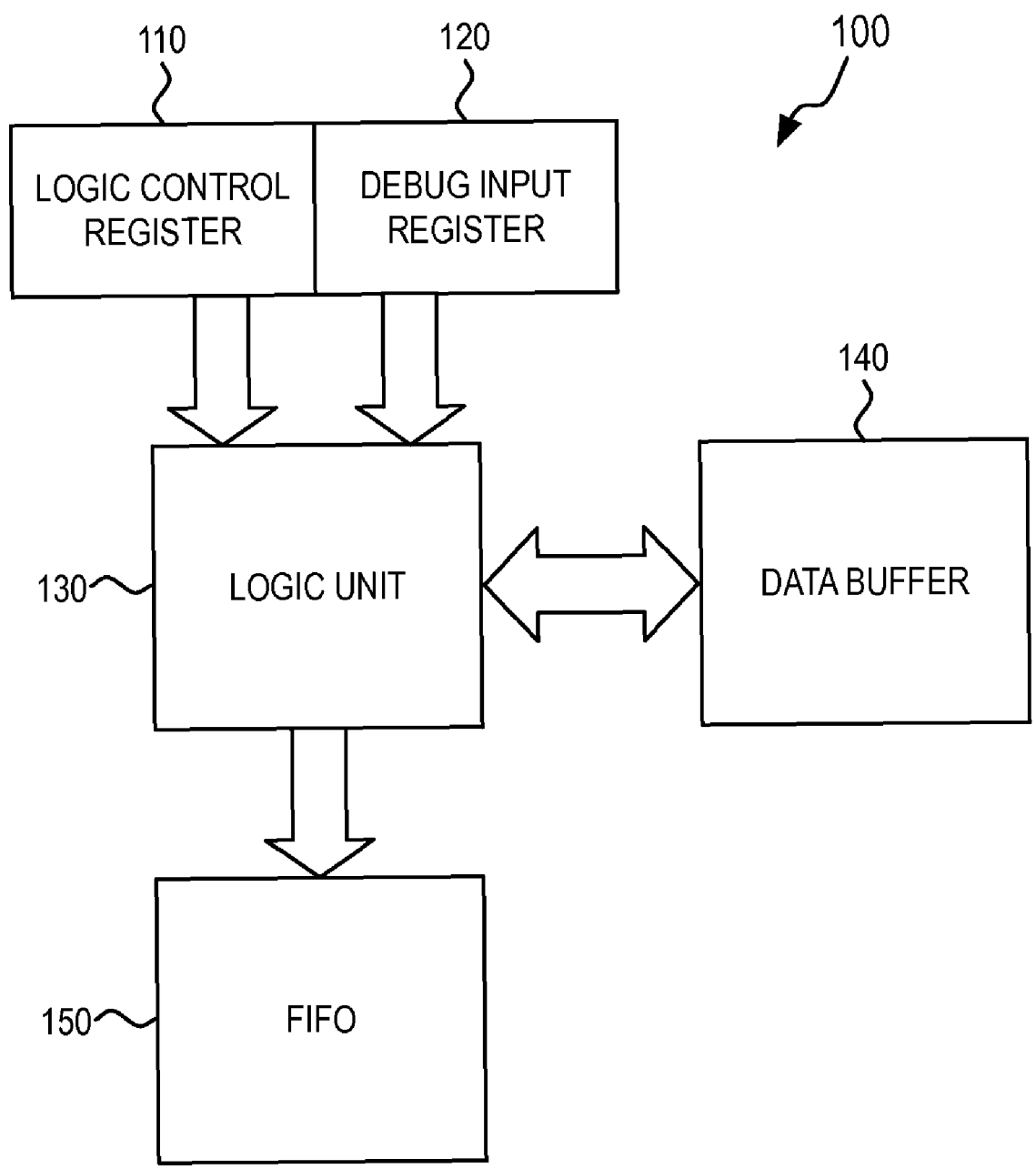
FIG. 1 illustrates an embodiment of a system for accelerating tracing.

To illustrate the various aspects of the present invention, reference is now made to the system diagram of FIG. 1. In general, system 100 includes a hardware acceleration system that can be implemented as part of the embedded device's system on a chip (SOC) to reduce the overhead of tracing on the processor. As illustrated, the hardware acceleration system includes two registers, logic control register 110 and debug input register 120, a small logic unit 130, and a small data buffer 140. In one embodiment, data buffer 140 is a small scratch random access memory (RAM) that is less than 1 kBytes in size. The hardware acceleration system sits in front of a serial universal asynchronous receiver/transmitter (UART) or universal serial bus (USB) hardware front-ended with a byte wide first-in first-out (FIFO) device 150.

In the hardware acceleration system, all data to be traced is written to debug input register 120. Logic unit 130 then makes a decision as to what to do with this input tracing data within one cycle of the bus on which the registers sit (to ensure the device is not blocking). In general, logic unit 130 determines whether the tracing data can be written directly to FIFO 150 or whether it should be written to data buffer 140 for later output when FIFO 150 has available space. As logic unit 130 is implemented in hardware, the processing of tracing data can be handled in parallel to the operation of the processor. This is contrast to the processing of tracing data using a low priority thread, which consumes significant resources of the processor.

The process of writing and reading data to and from data buffer 140, and writing data to FIFO 150 is enabled using logic control register 110. In one embodiment, logic unit 130 can handle the following commands from the processor via control register 110: read write pointer, set write pointer, read read pointer, set read pointer and read data (from data buffer 140). In this way, the processor can check whether the hardware acceleration system is becoming full and could reset it at initialization. The processor can also extract any unsent tracing data in the event of a failure if required. It should be noted that the hardware acceleration system can be designed to transmit all outstanding traces even when the processor has stopped.

Figure 2:
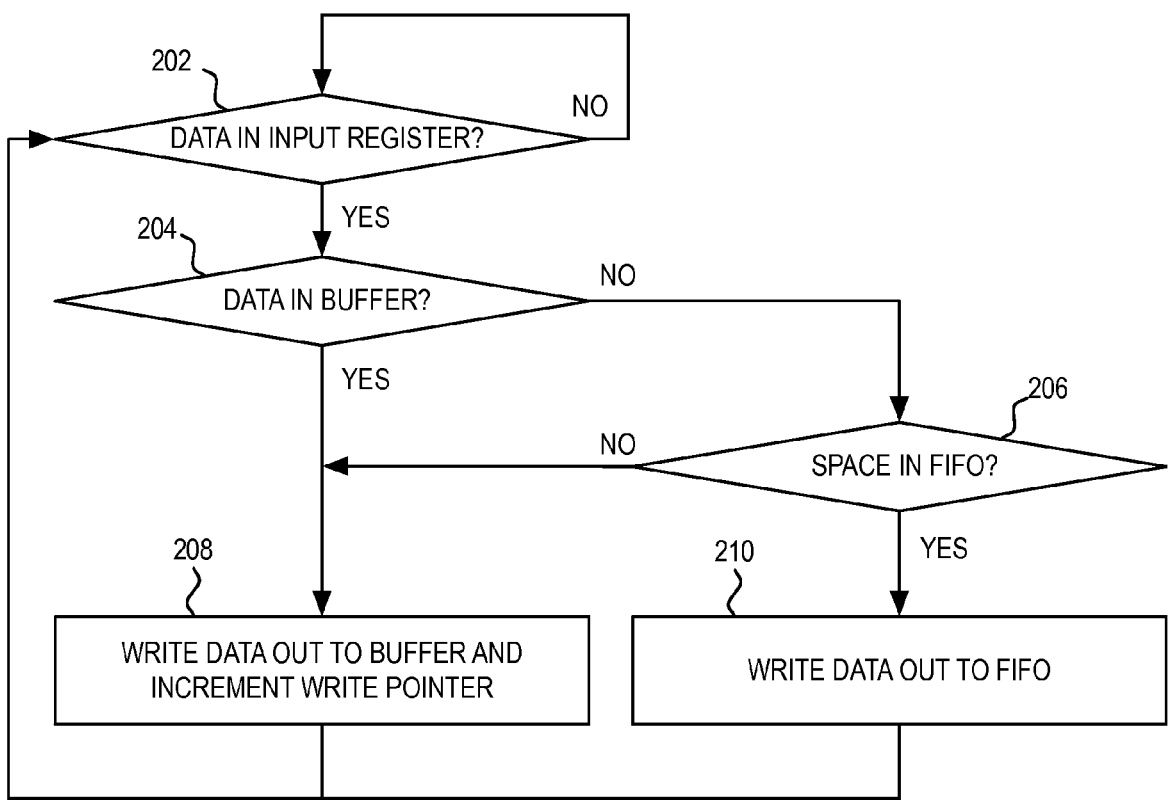
FIG. 2 illustrates a flowchart of a process of handling tracing data received from a debug input register.

FIG. 2 illustrates a flowchart of a process of handling tracing data received from debug input register 120. As illustrated, the process begins at step 202 where it is determined whether tracing data has been written to debug input register 120. If it is determined that no tracing data has been written to debug input register 120, then the process continues to monitor the status of debug input register 120. Once it is determined that data has been written to debug input register 120, the process continues to step 204 where it is determined if tracing data resides in data buffer 140.

If it is determined at step 204 that tracing data does reside in data buffer 140, then it is known that logic unit 130 cannot write the tracing data directly to FIFO 150. This can be inferred because the existence of tracing data in data buffer 140 indicates that logic unit 130 is waiting for space to become available in FIFO 150. That being the case, logic unit 130 then writes the tracing data to data buffer 140 at the write pointer location and increments the write pointer (wrapping at the end of data buffer 140) at step 208. If, on the other hand, it is determined at step 204 that tracing data does not reside in data buffer 140, then the possibility exists that the tracing data can be written directly to FIFO 150. Before this writing step can occur, however, logic unit 130 first determines at step 206, whether space exists in FIFO 150.

If it is determined at step 206 that space does not exist in FIFO 150, then logic unit 130 writes the tracing data to data buffer 140 and increments the write pointer at step 208. The tracing data will then reside in data buffer 140 until space becomes available in FIFO 150. On the other hand, if it is determined at step 206 that space does exist in FIFO 150, then logic unit 130 writes the tracing data out to FIFO 150 immediately at step 210.

In general, the writing of step 210 represents the condition that data buffer 140 is empty and FIFO 150 is not full. If either of these conditions are not true, then the tracing data is written to data buffer 140 at step 208.

It should be noted that debug input register 120 may be larger than the FIFO 150 register. This can be the case, for example, in a standard 32-bit system using an 8-bit UART FIFO. In this case, tracing data may always need to be written to data buffer 140 to be subsequently spooled out to FIFO 150 8 bits at a time.

Figure 3:
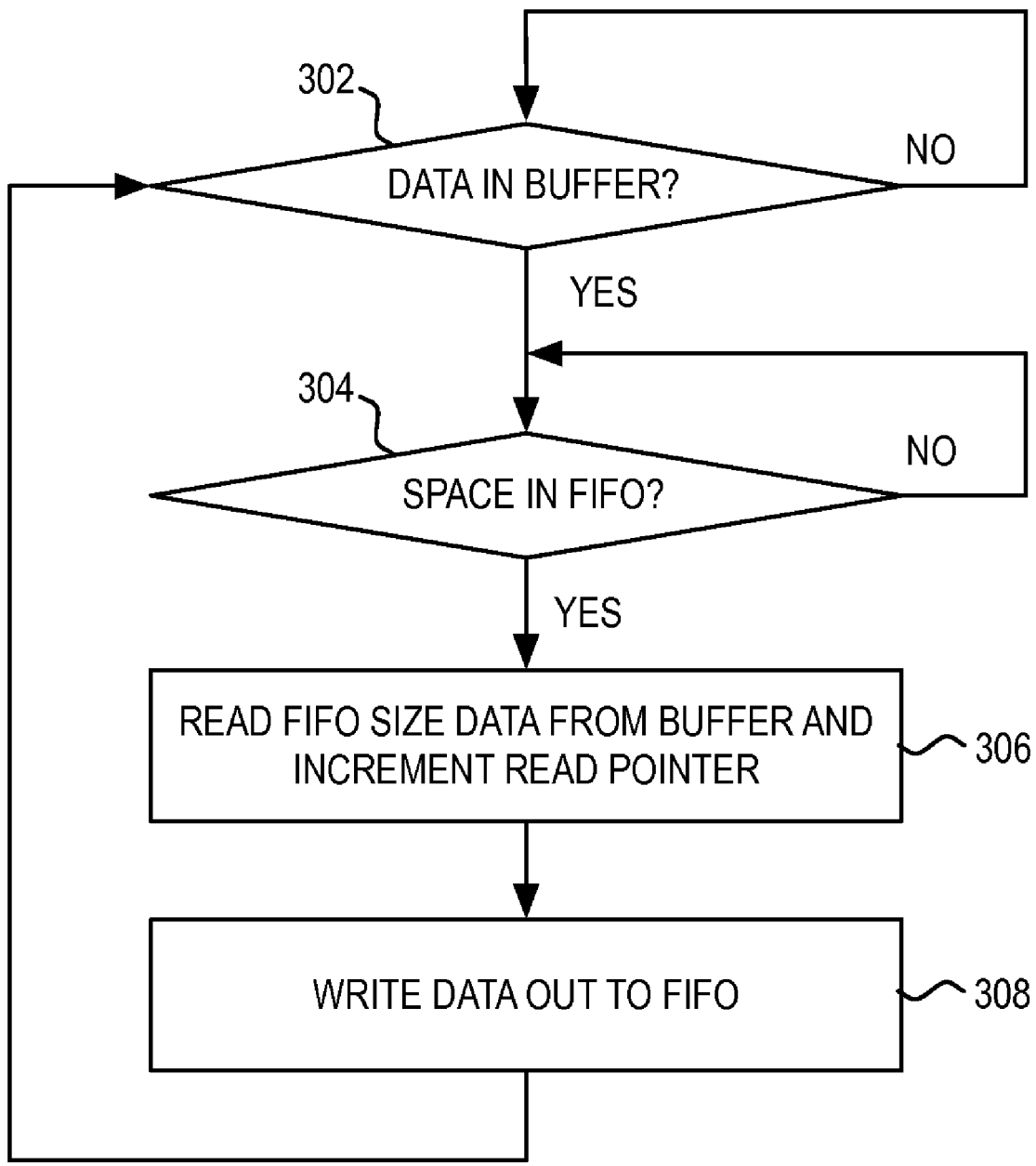
FIG. 3 illustrates a flowchart of a process of writing tracing data from a data buffer to a first-in first-out device.

The process of reading data from data buffer 140 and writing data to FIFO 150 is now described with reference to the flowchart of FIG. 3. As illustrated, the process begins at step 302 where it is determined whether tracing data resides in data buffer 140. If it is determined that no tracing data is stored in data buffer 140, then the process continues to monitor the status of data buffer 140. Once it is determined at step 302 that data is stored in data buffer 140, the process continues to step 304 where it is determined if space is available in FIFO 150. If it is determined at step 304 that space is not available in FIFO 150, then the process continues to monitor the status of FIFO 150. Once it is determined that space is available in FIFO 150, the process continues to step 306 where a FIFO-sized data is read from data buffer 140 and the read pointer is incremented. The FIFO-sized data read from data buffer 140 can then be written out to FIFO 150 at step 308.

Here, it should be noted that the splitting up of tracing data into smaller chunks is handled by logic unit 130. As logic unit 130 is implemented in hardware, the splitting up of tracing data can be handled in parallel to the operation of the processor. Again, this is contrast to the splitting up of tracing data using a low priority thread, which consumes significant resources of the processor.

It should also be noted that the logic included in logic unit 130 can be implemented using comparisons of two values, data buffer 140 write and read pointers, and the FIFO 150 full signal. For example, every cycle, logic unit 130 can perform a check on whether the data buffer write and read pointers are different and if so, if the FIFO full signal is not set. If this is the case, logic unit 130 can copy the data at the read pointer to FIFO 150 and increment the read pointer (wrapping at the end of data buffer 140).

In one embodiment, debug output is sent to data buffer 140 without regard to the usage of data buffer 140. In this case, data buffer 140 will only fill up when more data is being sent to it than the physical serial link can output. Tracing data may therefore be lost at some point. For example, if too much tracing data is sent to data buffer 140, data buffer 140 may start to overwrite unsent traces, which would then be lost.

In general, this embodiment can be used if the function of data buffer 140 is simply to deal with peaks in trace output. This embodiment therefore assumes that the average rate of trace production will not exceed the bandwidth of the tracing interconnect (UART/USB). In this design, the size of data buffer 140 can be optimized to the level of fluctuation in the tracing output.

In another embodiment, the processor can be designed to read the pointers from data buffer 140 using logic control register 110 and to determine how full data buffer 140 is before sending debug data to debug input register 120. While this embodiment may not be useful for high-performance tracing output, it may be very useful when a system performs a dump of state during a crash and wants to ensure that no trace data is lost. In this case, the processor can wait until the pointers indicate that there is appropriate space in data buffer 140 before sending more trace data.

As noted above, in one embodiment, data buffer 140 is implemented as a scratch RAM. In another embodiment, data buffer 140 can also be replaced with a larger FIFO. In this embodiment, logic unit 130 would be responsible for splitting the trace data up to the correct size of the FIFO within one bus cycle.

Finally, it should be noted that the principles of the present invention can applied to various embedded devices that generate debug trace output for which the usage of the processor can benefit from optimization. Examples of such embedded devices include mobile phones, TV set-top-boxes, and networking equipment.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system for delivering tracing data, comprising:
   a first-in first-out device;
   a data buffer that buffers tracing data intended for said first-in first-out device; and
   a logic unit coupled to said first-in first-out device and to said data buffer, said logic unit being configured to receive tracing data from a debug input register, said logic unit being further configured to write said received tracing data to said data buffer if said first-in first-out device is full, said logic unit also being configured to write said received tracing data to said first-in first-out device when said first-in first-out device has space available and said data buffer is empty.

2. The system of claim 1, further comprising a universal asynchronous receiver/transmitter that communicates said received data to the first-in first-out device.

3. The system of claim 1, further comprising a universal serial bus that communicates said received data to the first-in first-out device.

4. The system of claim 1, further comprising a logic register that enables said logic unit to read and set a write pointer, and read and set a read pointer of said data buffer.

5. The system of claim 1, wherein said data buffer is sized according to an expected peak rate of tracing and is less than 1 kBytes in size.

6. The system of claim 1, wherein said data buffer is a random access memory buffer.

7. The system of claim 1, wherein said data buffer is a first-in first-out device.

8. A tracing method, comprising:
  receiving, in a logic unit, tracing data from a debug input register;
  storing, by said logic unit, said received tracing data in a first-in first-out device coupled to said logic unit if space is available in said a first-in-first-out device and a buffer is empty;
  storing, by said logic unit, said received tracing data in a data buffer if said first-in first-out device coupled to said unit is full; and
  writing, by said logic unit, tracing data read from said data buffer when it is determined that space is available in said first-in first-out device.

9. The method of claim 8, wherein said storing in said data buffer comprises storing said received tracing data in a random access memory.

10. The method of claim 8, wherein said storing in said data buffer comprises storing said received tracing data in a second first-in first-out device.

11. The method of claim 10, further comprising splitting said received tracing data into a size dictated by said second first-in first-out device.

12. The method of claim 8, wherein said storing in said data buffer comprises storing said received tracing data in said data buffer if it is determined that said data buffer has stored data.

13. A tracing method, comprising:
  receiving, in a logic unit, tracing data from a debug input register;
  determining whether a data buffer coupled to said logic unit is empty and whether a first-in first-out device coupled to said logic unit has space available; and
  writing, by said logic unit, said received tracing data to said first-in first-out device if said data buffer is empty and said first-in first-out device has space available, wherein said writing bypasses said data buffer.

14. The method of claim 13, wherein said writing comprises writing using a universal asynchronous receiver/transmitter.

15. The method of claim 13, wherein said writing comprises writing using a universal serial bus.

16. The method of claim 13, further comprising writing said received tracing data to said data buffer if said data buffer is not empty or said first-in first-out device does not have space available.

17. The system of claim 1, wherein said logic unit receives tracing data from said data buffer in said logic unit prior to transferring said tracing data to said first-in first-out device.

18. A system for delivering tracing data, comprising:
  a first-in first-out device;
  a data buffer; and
  a logic unit coupled to said first-in-first out device and to said data buffer, said logic unit receiving tracing data from a debug input register, said logic unit being configured to write said received tracing data to said first-in first-out device when space is available in said first-in first-out device, to write said received tracing data to said data buffer when said received tracing data cannot be written to said first-in first-out device, and to transfer tracing data that is stored in said data buffer to said first-in first-out device when space becomes available in said first-in first-out device.

19. The system of claim 18, further comprising a universal asynchronous receiver/transmitter that communicates said received data to said first-in first-out device.

20. The system of claim 18, further comprising a universal serial bus that communicates said received data to said first-in first-out device.

21. The system of claim 18, further comprising a logic register that enables said logic unit to read and set a write pointer, and read and set a read pointer of said data buffer.

* * * * *

UNITED STATES PATENT AND TRADEMARK OFFICE
CERTIFICATE OF CORRECTION

| | | |
|---|---|---|
| PATENT NO. | : 7,870,436 B2 | Page 1 of 1 |
| APPLICATION NO. | : 11/740276 | |
| DATED | : January 11, 2011 | |
| INVENTOR(S) | : James King | |

It is certified that error appears in the above-identified patent and that said Letters Patent is hereby corrected as shown below:

Column 5, line 22, replace "said a first-in-first-out device and a buffer" with --said first-in-first-out device and a data buffer--.

Signed and Sealed this
Fifteenth Day of March, 2011

David J. Kappos
*Director of the United States Patent and Trademark Office*